United States Patent [19]

Nagakubo

[11] Patent Number: 5,757,343
[45] Date of Patent: May 26, 1998

[54] APPARATUS ALLOWING CONTINUOUS ADJUSTMENT OF LUMINANCE OF A PLASMA DISPLAY PANEL

[75] Inventor: Tetsuro Nagakubo, Koufu, Japan

[73] Assignee: Pioneer Electronic Corporation, Tokyo, Japan

[21] Appl. No.: 629,886

[22] Filed: Apr. 10, 1996

[30] Foreign Application Priority Data

Apr. 14, 1995 [JP] Japan ................... 7-089416

[51] Int. Cl.$^6$ ................... G09G 3/28; G09G 5/10; H04N 5/202
[52] U.S. Cl. ................... 345/63; 345/147; 345/148; 348/674
[58] Field of Search ................... 345/63, 214, 60, 345/68, 72, 147, 148; 348/674; 315/169.4

[56] References Cited

U.S. PATENT DOCUMENTS

| | | | |
|---|---|---|---|
| 5,237,315 | 8/1993 | Gay et al. | 345/112 |
| 5,315,695 | 5/1994 | Saito et al. | 345/63 X |
| 5,406,305 | 4/1995 | Shimomura et al. | 345/63 X |
| 5,475,448 | 12/1995 | Saegusa | 345/63 X |
| 5,481,317 | 1/1996 | Hieda | 348/674 |
| 5,493,342 | 2/1996 | Naito et al. | 348/674 X |
| 5,546,101 | 8/1996 | Sugawara | 345/63 |
| 5,589,889 | 12/1996 | Kawaoka | 348/674 |
| 5,592,187 | 1/1997 | Zenda | 345/3 |
| 5,661,575 | 8/1997 | Yamashita et al. | 348/674 X |

Primary Examiner—Steven J. Saras
Assistant Examiner—Seth D. Vail
Attorney, Agent, or Firm—Sughrue, Mion, Zinn, Macpeak & Seas, PLLC

[57] ABSTRACT

A luminance adjusting apparatus for a plasma display panel allows an adjustment of the luminance of a whole panel in a continuous manner. An adjustment to the number of times of light emission and a gain adjustment to pixel data are performed in association with each other in response to a luminance adjustment.

3 Claims, 10 Drawing Sheets

FIG. 2

| | SUB-FIELD | | | | | | | | TOTAL NUMBER OF TIMES OF LIGHT EMISSION |
|---|---|---|---|---|---|---|---|---|---|
| | SF1 | SF2 | SF3 | SF4 | SF5 | SF6 | SF7 | SF8 | |
| LUMINANCE MODE 1 | 512 | 256 | 128 | 64 | 32 | 16 | 8 | 4 | 1020 (100%) |
| LUMINANCE MODE 2 | 384 | 192 | 96 | 48 | 24 | 12 | 6 | 3 | 765 (75%) |
| LUMINANCE MODE 3 | 256 | 128 | 64 | 32 | 16 | 8 | 4 | 2 | 510 (50%) |
| LUMINANCE MODE 4 | 128 | 64 | 32 | 16 | 8 | 4 | 2 | 1 | 255 (25%) |

APPARATUS ALLOWING CONTINUOUS ADJUSTMENT OF LUMINANCE OF A PLASMA DISPLAY PANEL

BACKGROUND OF THE INVENTION

1. Field of the Invention

The present invention relates to a plasma display device which utilizes gas discharge light emission to display images, and more particularly to a luminance adjusting apparatus therefor.

2. Description of the Background Information

Recently, a variety of researches have been made on plasma display panels (hereinafter referred to as "PDP") operating as electronic display devices, for their characteristics as thin-shape two-dimensional displays.

In the PDP, because an element forming each pixel has only two states, i.e., light emitting state and non-light emitting state, a luminance gradation display by a so-called sub-field driving method is performed in order to realize half-tone luminance levels corresponding to a supplied video signal.

FIG. 1 shows the number of times of discharge light emission performed in each sub-field in one field period for achieving a 256 luminance gradation display. In the 256 luminance gradation display operation illustrated, one field period of a video signal is divided into eight sub-fields including, the first sub-field SF1 to the eighth sub-field SF8. Also, every field portion of a supplied video signal is divided into eight luminance components which are weighted by weighting coefficients 128, 64, 32, 16, 8, 4, 2, and 1, respectively, to generate first mode pixel data—eighth mode pixel data. In this event, the first mode pixel data corresponds to the highest luminance component in the video signal, and as the mode order number is higher, a lower weighting coefficient is applied to indicate a lower luminance component. Next, these first mode pixel data—eighth mode pixel data are respectively assigned to the first sub-field SF1—the eighth sub-field SF8, as mentioned above, and a discharge light emission operation is sequentially performed from the first sub-field SF1.

First, in the first sub-field SF1, discharge light emission using the first mode pixel data corresponding to the highest luminance component is repetitively performed 512 times. Next, in the second sub-field SF2, discharge light emission using the second mode pixel data one rank lower than the first mode pixel data is repetitively performed 256 times. Subsequently, in the third sub-field SF3, discharge light emission using the third mode pixel data one rank lower than the second mode pixel data is repetitively performed 128 times.

Subsequently, in a similar manner, like discharge light emission operations are performed in the fourth sub-field SF4—eighth sub-field SF8 as the number of times of the light emission N is decreased by a factor of two, thus accomplishing a display capable of representing 256 steps of luminance levels.

For example, with a predetermined pixel on a display panel taken into consideration, assume that pixel data corresponding to this pixel is (1, 0, 1, 0, 0, 0, 0, 0). It can be seen that in this case, first mode pixel data and third mode pixel data show "1" and the remaining mode pixel data show "0". This means that within the first sub-field SF1—the eighth sub-field SF8 in FIG. 1, the discharge light emission is performed only in the first sub-field SF1 and the third sub-field SF3. In effect, the discharge light emission is performed a total of 640 times (512+128=640), and the luminance corresponding to the 640 times of discharge light emission is visually produced.

In the display device as described above, the number of times of discharge light emission operations performed during one field period is relied on to produce half-tone luminance corresponding to a supplied video signal.

Thus, if the number of times of the light emission operations performed in each of the sub-field SF1—the sub-field SF8 shown in FIG. 1 is changed as shown in FIG. 2 while maintaining the above-mentioned relationship between the weighting coefficients 128:64:32:16:8:4:2:1 and the sub-fields SF1–SF8, the luminance level can be adjusted even in a display panel such as PDP and EL which has only two states of light emission and non-light emission.

Referring specifically to FIG. 2, a luminance mode 1 is set when the luminance level of the whole panel is to be maximum. In the luminance mode 1, the discharge light emission is performed 512 times in the sub-field SF1, where the number of times of the discharge light emission is the largest; 256 times in SF2; ...; 8 times in SF7; and 4 times in SF8, where the number of times of the discharge light emission is the smallest, as can be seen from FIG. 2. In the luminance mode 1, the discharge light emission is performed in respective periods indicated by hatching in FIG. 3A, where a maximum total number of times of the discharge light emission performed in the field period amounts to 1020.

If the luminance level of the whole panel is to be adjusted one rank lower than the luminance mode 1, the setting for a luminance mode 2 is performed. In the luminance mode 2, the discharge light emission is performed 384 times in the sub-field SF1, where the number of times of the discharge light emission is the largest; 192 times in SF2; ...; 6 times in SF7; and 3 times in SF8, where the number of times of the discharge light emission is the smallest, as can be seen from FIG. 2. Stated another way, in the luminance mode 2, the number of times of discharge light emission in the sub-field SF8 is decreased by one from the number of times of discharge light emission in the sub-field SF8 in the luminance mode 1, i.e., 4, and based on this, the number of times of discharge light emission is determined in each of the remaining sub-fields with the above-mentioned relationship of the weighting coefficients 128:64:32:16:8:4:2:1 applied to the sub-fields SF1–SF8. In the luminance mode 2, the discharge light emission is performed in respective periods indicated by hatching in FIG. 3B, where a maximum total number of times of the discharge light emission performed in the field period amounts to 765. In this event, the luminance level of the whole panel is 75% of the luminance level produced when the emission is performed for a display in accordance with the setting of the luminance mode 1.

Similarly, by changing the setting of the luminance mode to a luminance mode 3 and to a luminance mode 4, the luminance of the whole panel can be adjusted stepwise, such as 50% and 25%, as shown in FIGS. 3C and 3D, respectively.

However, the above-mentioned luminance adjustment can provide only four steps in accordance with the luminance modes 1–4, so that the luminance cannot be adjusted continuously.

OBJECT AND SUMMARY OF THE INVENTION

The present invention has been made to solve the problem mentioned above, and its object is to provide a luminance adjusting apparatus in a plasma display panel which is capable of continuously adjusting the luminance of the whole panel.

According to the present invention, there is provided a luminance adjusting apparatus in a plasma display panel which divides image information in one field into a plurality of pixel data corresponding to the magnitude of luminance, sets the number of times of emission in each of said pixel data in accordance with the magnitude of luminance, and perform emission driving to provide a gradation display, the apparatus comprising luminance adjusting signal generating means for generating a luminance adjusting signal corresponding to a luminance level to be adjusted, region determining means for determining which of a plurality of regions defined by different ranges from each other a value of said luminance adjusting signal falls under, emission frequency setting means for setting a number of times of emission corresponding to a region determined by said region determining means, and gain adjusting means for performing a gain adjustment to said pixel data by a gain characteristic corresponding to said determined region.

In the present invention, an adjustment to the number of times of emission and a gain adjustment to pixel data are performed in association with each other in accordance with a luminance adjustment, thus making it possible to continuously adjust the luminance of the plasma display panel.

BRIEF DESCRIPTION OF THE DRAWINGS

FIG. 2 is a diagram showing a correspondence of the respective luminance modes to the numbers of times of discharge light emission;

DESCRIPTION OF THE PREFERRED EMBODIMENTS

Figure 1:
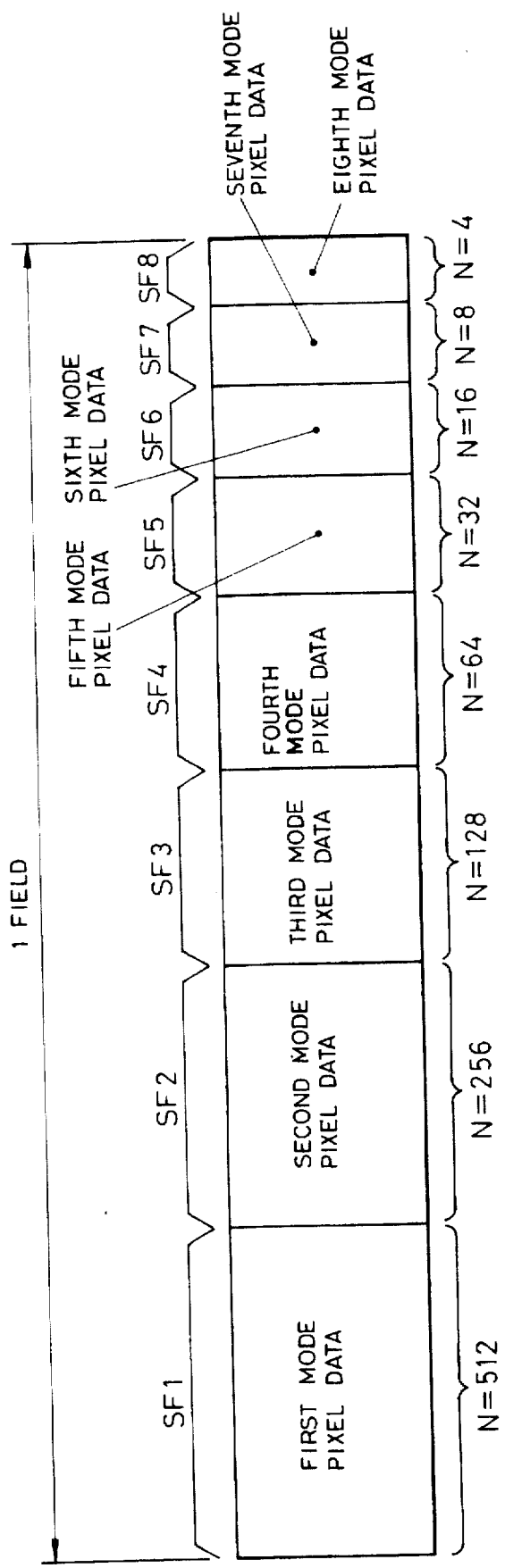
FIG. 1 is a diagram showing the number of times of discharge light emission performed during one field period in a 256 luminance gradation display.
Figure 3:
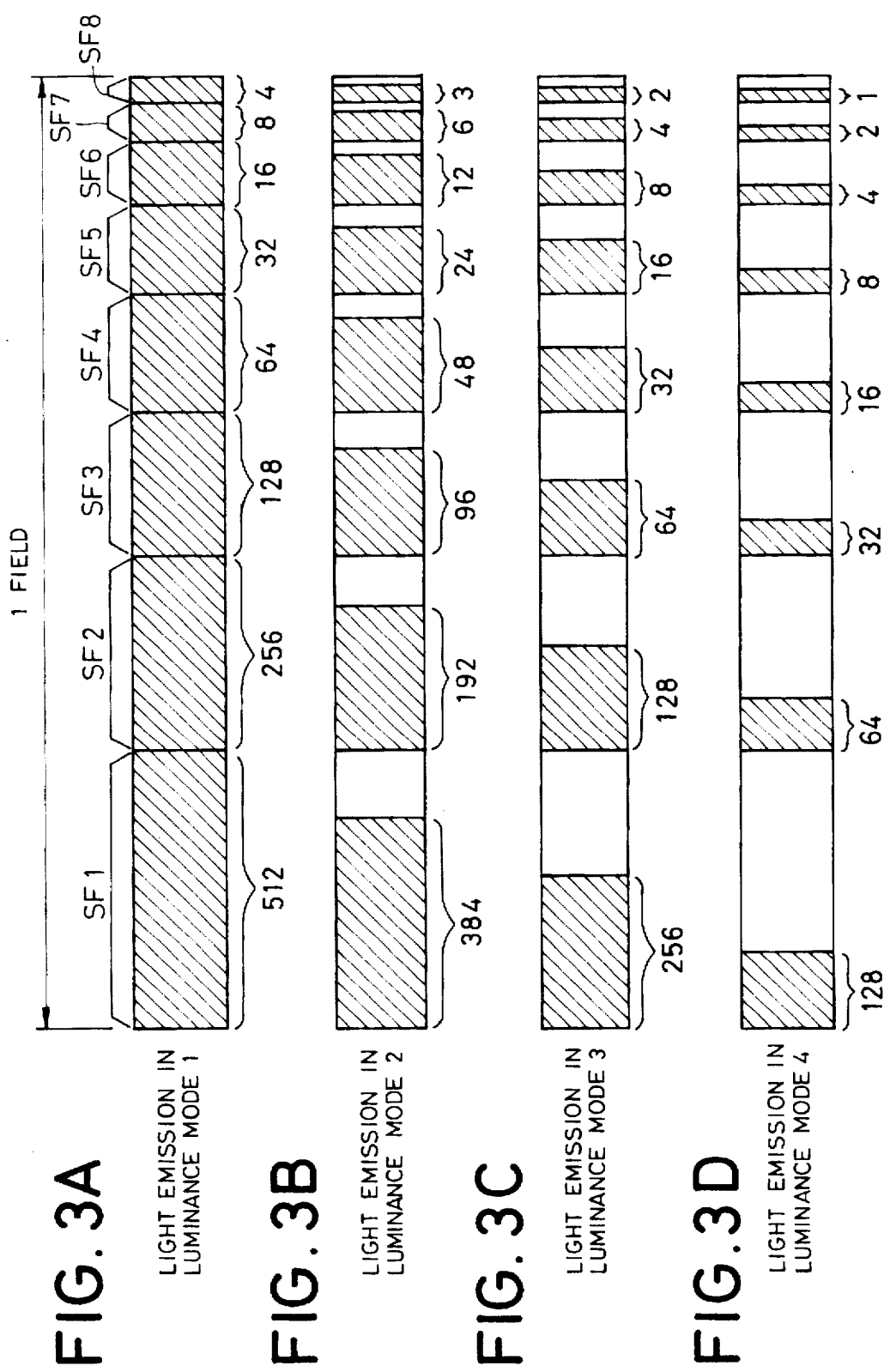
FIGS. 3A–3D are diagrams for comparing discharge light emission periods in the respective luminance modes.
Figure 4:
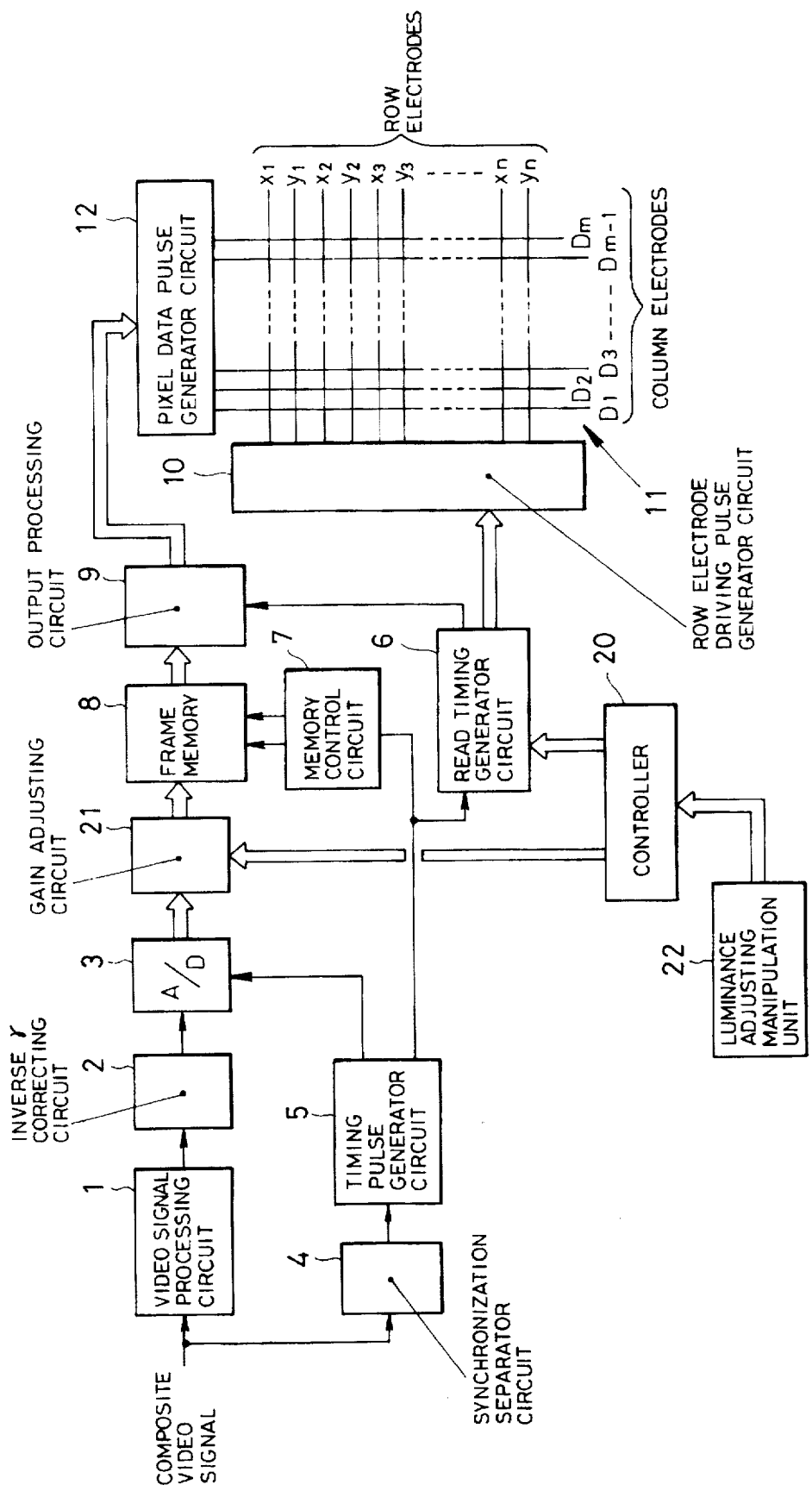
FIG. 4 is a block diagram illustrating the configuration of a plasma display device comprising a luminance adjusting apparatus according to the present invention.

FIG. 4 illustrates the configuration of a plasma display device comprising a luminance adjusting apparatus according to the present invention.

Referring specifically to FIG. 4, a video signal processing circuit 1 separates and extracts an R video signal corresponding to a red video component, a G video signal corresponding to a green video component, and a B video signal corresponding to a blue video component from a composite video signal supplied thereto, and supplies these extracted signals to an inverse γ correcting circuit 2.

Figure 5:
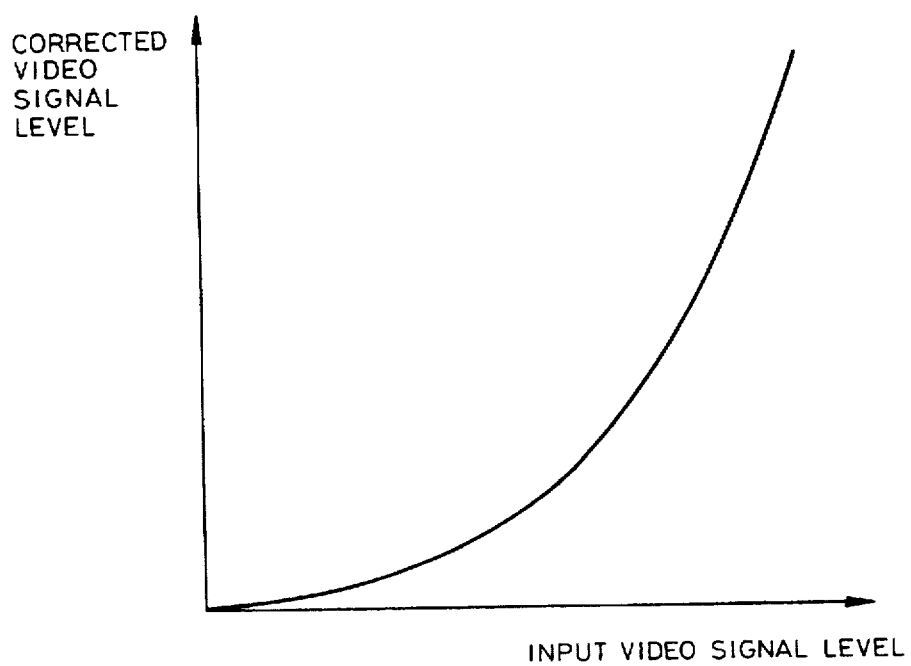
FIG. 5 is a diagram representing a conversion characteristic provided by an inverse g correcting circuit 2.

The inverse γ correcting circuit 2 converts the respective signal levels of these R video signal, G video signal and B video signal in accordance with a non-linear conversion characteristic as shown in FIG. 5, such that the signal levels match with an input-luminance characteristic of a PDP (plasma display panel) 11, later described. In this event, a corrected R video signal, a corrected G video signal and a corrected B video signal, thus produced, are supplied to an A/D convertor circuit 3. A synchronization separator circuit 4 extracts horizontal and vertical synchronization signals from the composite video signal, and supplies them to a timing pulse generator circuit 5. The timing pulse generator circuit 5 generates a variety of timing pulses based on these horizontal and vertical synchronization signals. The A/D convertor circuit 3 converts the corrected R video signal, the corrected G video signal and the corrected B video signal to digital R-pixel data, G-pixel data and B-pixel data, respectively, in synchronism with timing pulses supplied from the timing pulse generator circuit 5, and supplies the digitally converted data to a gain adjusting circuit 21.

The gain adjusting circuit 21 adjusts the gains of the respective R-pixel data, G-pixel data and B-pixel data in response to a gain adjusting signal supplied from a controller 20, later described, and supplies the resulting adjusted R-pixel data, adjusted G-pixel data and adjusted B-pixel data to a frame memory 8.

Figure 6:
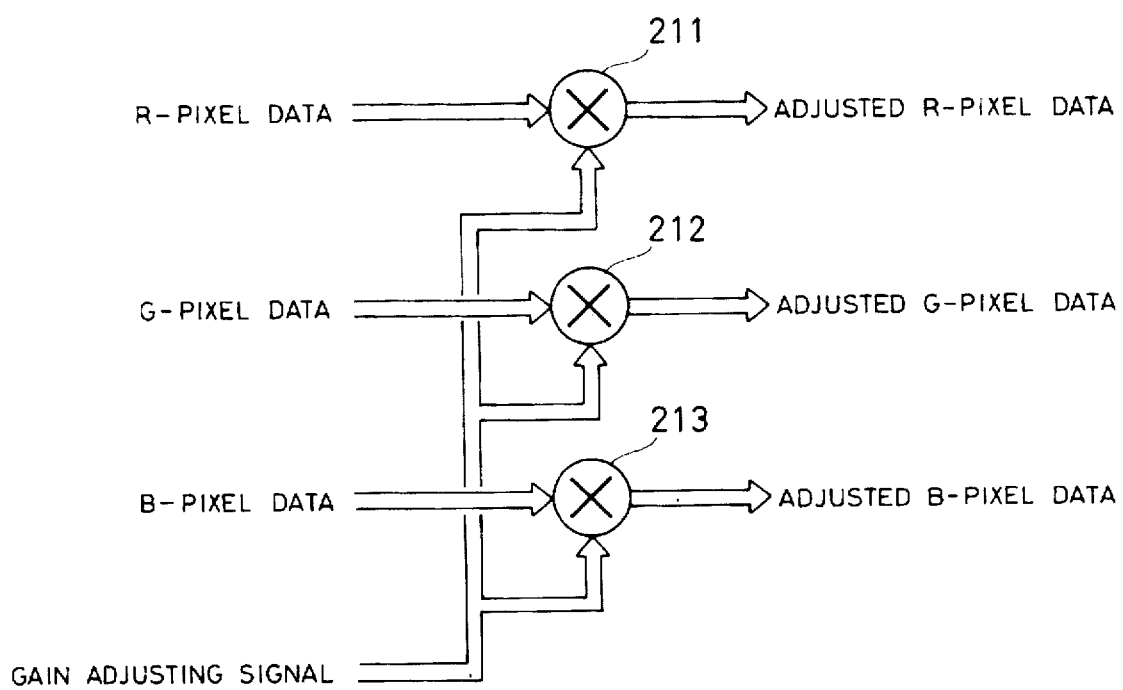
FIG. 6 is a diagram illustrating the internal configuration of a gain adjusting circuit 21.

FIG. 6 illustrates an example of the inner configuration of the gain adjusting circuit 21.

Referring specifically to FIG. 6, a multiplier 211 multiplies a data value indicated by the R-pixel data by a gain adjusting signal supplied from the controller 20, and supplies the multiplication result to the frame memory 8 as adjusted R-pixel data. A multiplier 212, in turn, multiplies a data value indicated by the G-pixel data by the gain adjusting signal, and supplies the multiplication result to the frame memory 8 as the adjusted G-pixel data. A multiplier 213 likewise multiplies a data value indicated by the B-pixel data by the gain adjusting signal, and supplies the multiplication result to the frame memory 8 as the adjusted B-pixel data. A memory control circuit 7 supplies the frame memory 8 with a write signal and a read signal in synchronism with timing pulses supplied from the timing pulse generator circuit 5. The frame memory 8, responsive to the write signal, sequentially fetches the respective adjusted pixel data supplied from the gain adjusting circuit 21. Also, the frame memory 8, responsive to the read signal, sequentially reads pixel data stored therein and supplies the read data to an output processing circuit 9 at the next stage.

A read timing signal generator circuit 6 generates a timing signal corresponding to a supply timing of a pixel data pulse, and supplies this timing signal to the output processing circuit 9. Also, the read timing signal generator circuit 6 is set to either of luminance modes 1–4 shown in FIG. 2, in response to a luminance mode setting signal supplied from the controller 20, later described. In this event, the read timing signal generator circuit 6 generates supply timing signals for a scan pulse for starting the discharge light emission, a maintaining pulse for maintaining a discharge state, and an erasure pulse for stopping the discharge light emission to be supplied to the PDP 11 (later described), and supplies these timing signals to a row electrode driving pulse generator circuit 10, so as to perform the discharge light emission a number of times corresponding to the set luminance mode. For example, when the luminance mode 2 shown in FIG. 2 is set, the supply timing signal for the scan pulse is first supplied to the row electrode driving pulse generator circuit 10, and then the supply timing signal for the maintaining pulse is supplied 384 times successively to the row electrode driving pulse generator circuit 10 in the period of the sub-field SF1. Finally, the erasure pulse signal is supplied to the row electrode driving pulse generator circuit 10. The output processing circuit 9 generates first— eighth mode pixel data corresponding to a luminance gradation level for every field portion of pixel data supplied from the frame memory 8, and supplies a pixel data pulse generator circuit 12 with the generated pixel data in synchronism with the timing signal from the read timing signal generator circuit 6.

The row electrode driving pulse generator circuit 10, responsive to a variety of timing signals supplied from the read timing signal generator circuit 6, generates the scan pulse, the maintaining pulse, and the erasure pulse, respectively, and supplies these pulses to row electrodes $Y_1$-$Y_f$ and $X_1$-$X_n$ of the PDP (plasma display panel) 11. The pixel data pulse generator circuit 12 generates pixel data pulses each having a voltage value corresponding to logical "1" or "0" of each pixel data in one filed portion of pixel data supplied from the output processing circuit 9, divides these pixel data pulses for each row, and applies the pixel data pulses divided for each row to column electrodes $D_1$-$D_m$ in a time division fashion.

The PDP 11 starts the discharge light emission corresponding to the pixel data pulse when it is applied with the scan pulse from the row electrode driving pulse generator circuit 10, and maintains the emission state for a period in which the maintaining pulse is being applied thereto. Subsequently, the discharge light emission is stopped when the PDP 11 is applied with the erasure pulse from the row electrode driving pulse generator circuit 10.

The luminance adjusting manipulation unit 22 generates a luminance adjusting signal corresponding to a luminance level set by the user's luminance adjusting manipulation, and supplies the luminance adjusting signal to the controller 20. For example, when the user has set the highest luminance level by his manipulation, the luminance signal having a data value "1.0", is supplied to the controller 20.

The controller 20 is implemented, for example, by a microcomputer composed of a CPU (central processing unit), ROM (read only memory), RAM (random access memory), and so on. The controller 20 controls the operation of the whole plasma display device in accordance with software previously stored in the ROM 20. In this event, when a luminance adjusting control subroutine is initiated during the execution of the software, the controller 20 performs luminance adjusting control based on the luminance adjusting signal supplied from the luminance adjusting manipulation unit 22.

Figure 7:
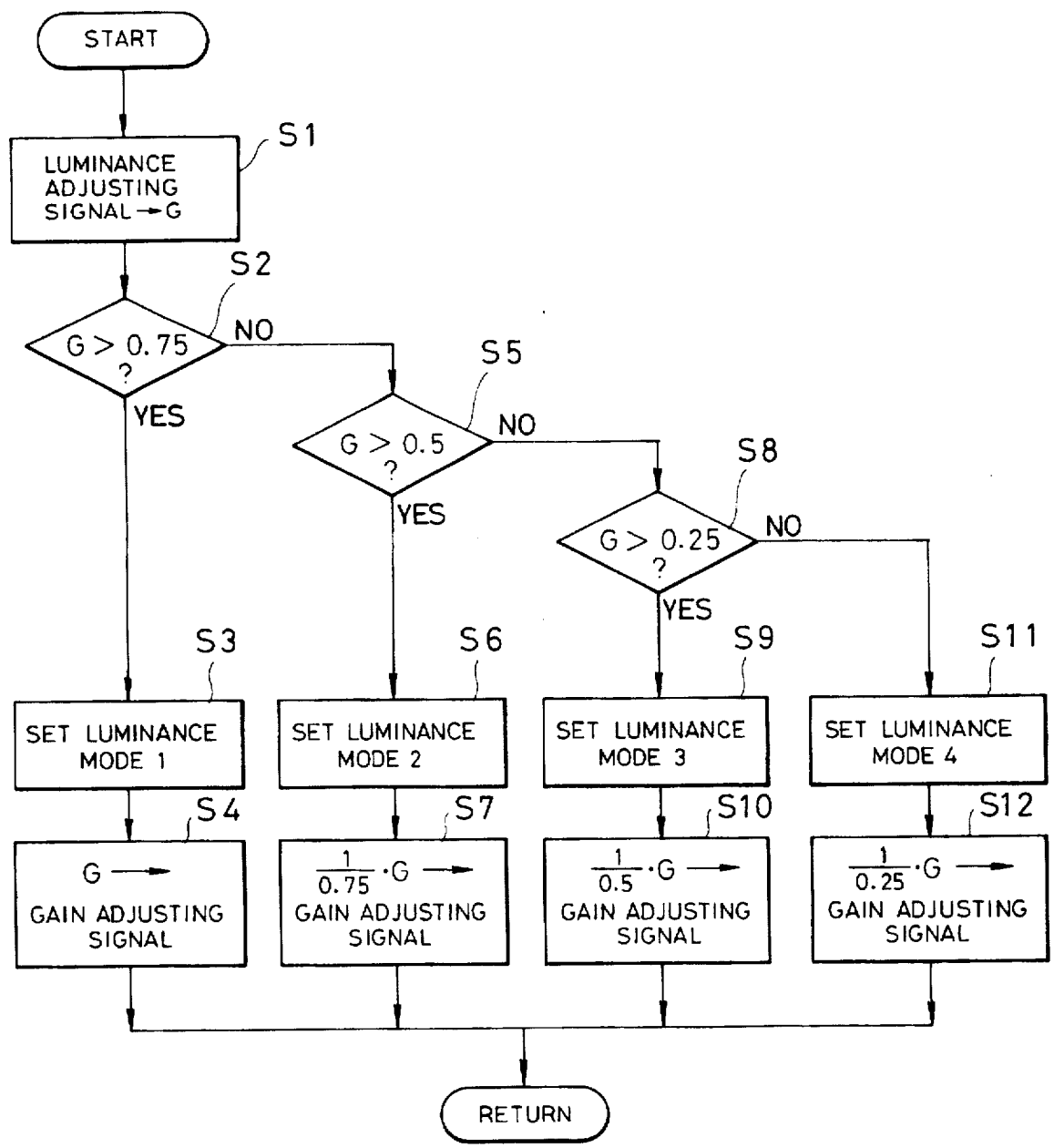
FIG. 7 is a flow diagram representing the procedure of a luminance adjusting control subroutine.

FIG. 7 represents a flow chart of the luminance adjusting control subroutine. Referring specifically to FIG. 7, the CPU in the controller 20 first fetches the luminance adjusting signal supplied from the luminance adjusting manipulation unit 22 and stores this luminance adjusting signal into a register G built in the CPU (step S1). Next, the CPU determines whether or not the data value indicated by the luminance adjusting signal stored in the register G is larger than "0.75" (step S2). At step S2, if a result of determination is that the data value indicated by the luminance adjusting signal is larger than "0.75", the CPU supplies the read timing signal generator circuit 6 with a luminance mode setting signal for setting the luminance mode 1 within the luminance modes 1-4 shown in FIG. 2 (step S3). In accordance with the result of executing step S3, the read timing signal generator circuit 6 is set in the luminance mode 1 shown in FIG. 2. In this event, the row electrode driving pulse generator circuit 10 generates the scan pulse, the maintaining pulse and the erasure pulse for performing the discharge light emission for each sub-field, indicated by the luminance mode 1, and applies these pulses to the PDP 11. The CPU next supplies the gain adjusting circuit 21 with the luminance adjusting signal stored in the register G as it is as a gain adjusting signal (step S4). By the execution of step S4, the gain adjusting circuit 21 performs a gain adjustment to the R-pixel data, G-pixel data and B-pixel data supplied from the A/D convertor circuit 3 based on the gain adjusting signal, and supplies the frame memory 8 with the resulting adjusted R-pixel data, adjusted G-pixel data and adjusted B-pixel data.

Conversely, if the result of determination at step S2 is that the data value indicated by the luminance adjusting signal is not larger than "0.75", the CPU determines whether or not the data value indicated by the luminance adjusting signal is larger than "0.5" (step S5). If a result of determination at step S5 is that the data value indicated by the luminance adjusting signal is larger than "0.5", the CPU supplies the read timing signal generator circuit 6 with a luminance mode setting signal for setting the luminance mode 2 within the luminance modes 1-4 shown in FIG. 2 (step S6). In accordance with the result of executing step S6, the read timing signal generator circuit 6 is set in the luminance mode 2 shown in FIG. 2. In this event, the row electrode driving pulse generator circuit 10 generates the scan pulse, the maintaining pulse and the erasure pulse for performing the discharge light emission for each sub-field, indicated by the luminance mode 2, and applies these pulses to the PDP 11. Next, the CPU multiplies the luminance adjusting signal stored in the register G by $1/0.75$ and supplies the gain adjusting circuit 21 with the multiplication result as the gain adjusting signal (step S7). By the execution of step S7, the gain adjusting circuit 21 performs a gain adjustment to the R-pixel data, G-pixel data and B-pixel data supplied from the A/D convertor circuit 3 based on the gain adjusting signal, and supplies the frame memory 8 with the resulting adjusted R-pixel data, adjusted G-pixel data and adjusted B-pixel data.

Conversely, if the result of determination at step S5 is that the data value indicated by the luminance adjusting signal is not larger than "0.5", the CPU determines whether the data value indicated by the luminance adjusting signal is larger than "0.25" (step S8). If determining a result of determination at step S8 is that the data value indicated by the luminance adjusting signal is larger than "0.25", the CPU supplies the read timing signal generator circuit 6 with a luminance mode setting signal for setting the luminance mode 3 within the luminance modes 1-4 shown in FIG. 2 (step S9). In accordance with the execution of step S9, the read timing signal generator circuit 6 is set in the luminance mode 3 shown in FIG. 2. In this event, the row electrode driving pulse generator circuit 10 generates the scan pulse, the maintaining pulse and the erasure pulse for performing the discharge light emission for each sub-field, indicated by the luminance mode 3, and applies these pulses to the PDP 11. Next, the CPU multiplies the luminance adjusting signal stored in the register G by $1/0.5$, i.e., 2, and supplies the multiplication result as the gain adjusting signal to the gain adjusting circuit 21 (step S10). By the execution of step S10, the gain adjusting circuit 21 performs a gain adjustment to the R-pixel data, G-pixel data and B-pixel data supplied from the A/D convertor circuit 3 based on the gain adjusting signal, and supplies the frame memory 8 with the resulting adjusted R-pixel data, adjusted G-pixel data and adjusted B-pixel data.

Conversely, if determining at step S8 that the data value indicated by the luminance adjusting signal is not larger than "0.25", the CPU supplies the read timing signal generator circuit 6 with a luminance mode setting signal for setting the luminance mode 4 within the luminance mode 1–4 indicated in FIG. 2 (step S11). In accordance with the result of executing step S11, the read timing signal generator circuit 6 is set in the luminance mode 4 shown in FIG. 2. In this event, the row electrode driving pulse generator circuit 10 generates the scan pulse, the maintaining pulse and the erasure pulse for performing the discharge light emission for each sub-field, indicated by the luminance mode 4, and applies these pulses to the PDP 11. Next, the CPU multiplies the luminance adjusting signal stored in the register G by $1/0.25$, i.e., 4, and supplies the gain adjusting circuit 21 with the multiplication result as the gain adjusting signal (step S12). By the execution of step S12, the gain adjusting circuit 21 performs a gain adjustment to the R-pixel data, G-pixel data and B-pixel data supplied from the A/D convertor circuit 3 based on the gain adjusting signal, and supplies the frame memory 8 with the resulting adjusted R-pixel data, adjusted G-pixel data and adjusted B-pixel data.

In summary, the foregoing steps S2, S5, S8 constitute a region determining means for determining which of the following regions "larger than 0.75", "0.75–0.5", "0.5–0.25", and "less than 0.25" the value of the luminance adjusting signal falls under, while the foregoing steps S3, S6, S9, S11 constitute a emission frequency setting means for setting the number of times of emission corresponding to a determined region.

Upon completing the execution of step S4, S7, S10 or S12, the CPU exits the luminance adjusting control subroutine, and returns to execute the man flow for controlling the operation of the whole plasma display device.

Figure 8:
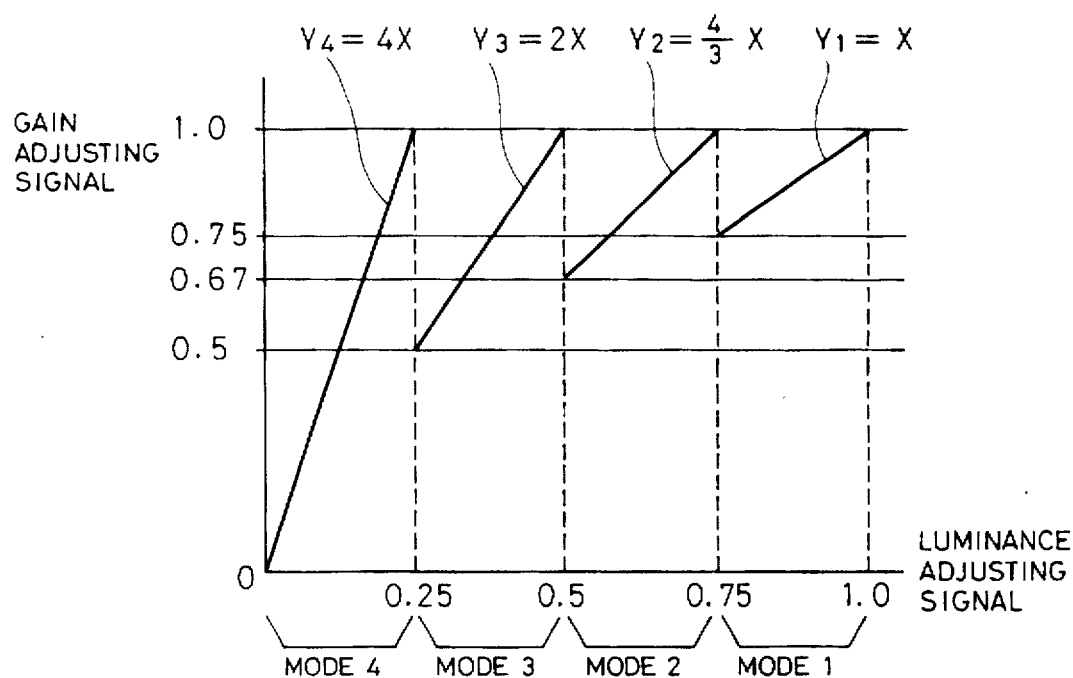
FIG. 8 is a diagram for explaining an operation of converting a luminance adjusting signal to a gain adjusting signal.

FIG. 8 is a graph for explaining an operation of converting a luminance adjusting signal to a gain adjusting signal carried out by the execution of the luminance adjusting control subroutine.

Referring specifically to FIG. 8, if a luminance adjusting signal provided by the user's luminance adjusting manipulation falls under a range between "1.0" and "0.75" corresponding to the highest luminance level, the discharge light emission is performed in accordance with the luminance mode 1. In this event, the luminance adjusting signal is converted to the gain adjusting signal by a conversion function $Y_1=X$ as shown in FIG. 8. In other words, if the value of the luminance adjusting signal is within the range between "1.0" and "0.75", a gain adjustment is performed to respective R, G, B-pixel data in accordance with a gain characteristic $Y_1$ as shown in FIG. 8.

If the luminance adjusting signal provided by the user's luminance adjusting manipulation is within the range between "0.75" and "0.5", the discharge light emission is performed in accordance with the luminance mode 2. In this event, the luminance adjusting signal is converted to the gain adjusting signal by a conversion function $Y_2=(1/0.75)X=(4/3)X$ as shown in FIG. 8. In other words, if the value of the luminance adjusting signal is within the range between "0.75" and "0.5", the gain adjustment is performed to respective R, G, B-pixel data in accordance with a gain characteristic $Y_2$ as shown in FIG. 8.

If the luminance adjusting signal provided by the user's luminance adjusting manipulation is within the range between "0.5" and "0.25", the discharge light emission is performed in accordance with the luminance mode 3. In this event, the luminance adjusting signal is converted to the gain adjusting signal by a conversion function $Y_3=(1/0.5)X=2X$ as shown in FIG. 8. In other words, if the value of the luminance adjusting signal is within the range between "0.5" and "0.25", the gain adjustment is performed to respective R, G, B-pixel data in accordance with a gain characteristic $Y_3$ as shown in FIG. 8.

Furthermore, if the luminance adjusting signal provided by the user's luminance adjusting manipulation is less than "0.25", the discharge light emission is performed in accordance with the luminance mode 4. In this event, the luminance adjusting signal is converted to the gain adjusting signal by a conversion function $Y_4=(1/0.25)X=4X$ as shown in FIG. 8. In other words, if the value of the luminance adjusting signal is less than "0.25", the gain adjustment is performed to respective R, G, B-pixel data with a gain characteristic $Y_4$ as shown in FIG. 8.

For example, if a luminance adjustment is performed to lower the luminance of the panel when the emission for display in accordance with the luminance mode 1 is going on as an initial state, the gain of pixel data is first reduced by the gain characteristic $Y_1$ to lower the luminance of the panel. In this event, the reduction in the gain of the pixel data would also cause the linearity of images as well as the luminance of the panel to lower. However, in the present invention, the emission for display in accordance with the luminance mode 2 is entered before the linearity of images is lowered below a predetermined reference, whereby the number of times of emission is decreased to carry out the adjustment for lowering the luminance. In this event, since the luminance is lowered by decreasing the number of times of emission, the gain characteristic for pixel data is changed to $Y_2$ to enhance the gain characteristic so as to maintain the linearity of the image.

Figure 9:
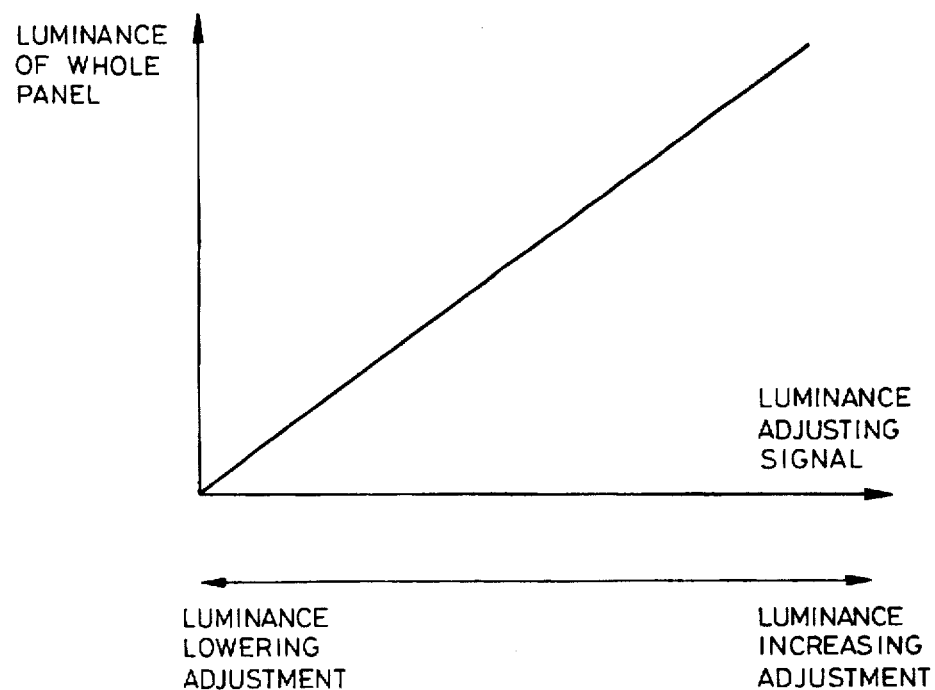
FIG. 9 is a diagram representing a correspondence relationship between the luminance adjusting signal and the luminance of a panel.

As described above, the luminance adjusting apparatus in a plasma display panel performs a gain adjustment to pixel data and a stepwise adjustment (luminance modes 1–4) of the number of times of emission in association with each other to enable a continuous luminance adjustment in accordance with luminance adjusting manipulation, as shown in FIG. 9.

While the foregoing embodiment has been described in connection with a manually manipulated luminance adjustment, such luminance adjustment may be applied as a power limit apparatus (corresponding to an ABL circuit in CRT). Specifically, since the PDP has substantially a proportional relationship between luminance and power consumption, the power limit can be achieved by automatically adjusting the luminance.

Figure 10:
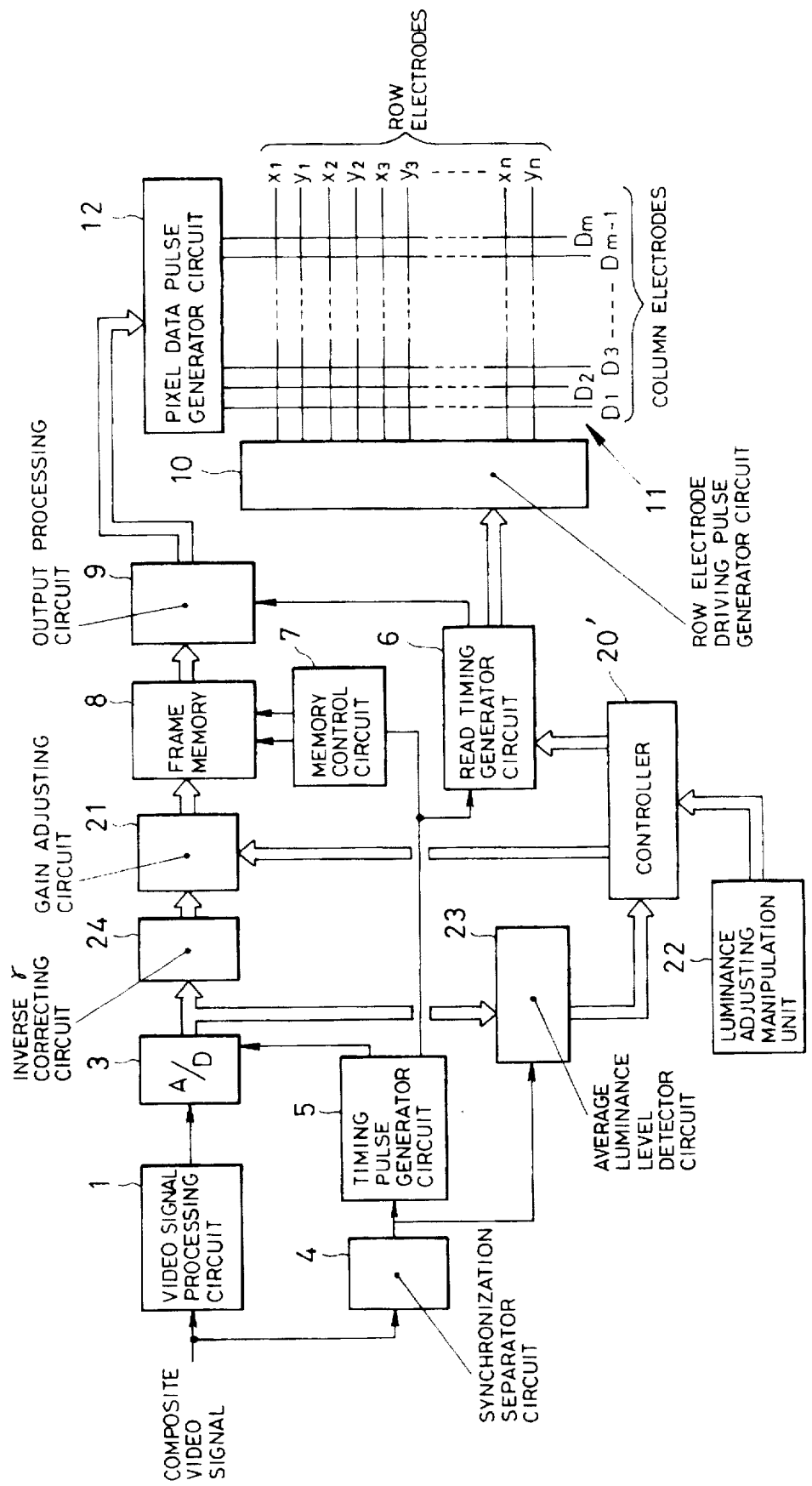
FIG. 10 is a block diagram illustrating the configuration of a plasma display device comprising a luminance adjusting apparatus according to another embodiment of the present invention.

FIG. 10 illustrates the configuration of a power limit apparatus (automatic luminance limit apparatus) which is applied to a plasma display device as described above.

It should be noted that functional modules in FIG. 10 having he same functions as those in FIG. 4 are designated the same reference numerals.

Referring specifically to FIG. 10, a video signal processing circuit 1 separates and extracts an R video signal corresponding to a red video component, a G video signal corresponding to a green video component and a B video signal corresponding to a blue video component from a composite video signal supplied thereto, and supplies these video signals to an A/D convertor circuit 3.

The A/D convertor circuit 3 converts the R video signal, the G video signal and the B video signal to digital R-pixel data, G-pixel data and B-pixel data, respectively, in synchronism with timing pulses supplied from a timing pulse generator circuit 5, and supplies the pixel data to each of an average luminance level detector circuit 23 and an inverse γ correcting circuit 24. The inverse g correcting circuit 24 converts the pixel data values of these R-pixel data, G-pixel data and B-pixel data in accordance with a non-linear conversion characteristic as shown in FIG. 5, and supplies each of the resulting corrected R-pixel data, corrected G-pixel data and corrected B-pixel data to a gain adjusting circuit 21.

The average luminance level detector circuit 23 detects an average luminance level based on one field portion of R-pixel data, G-pixel data and B-pixel data each time a vertical synchronization signal is supplied from a synchronization separator circuit 4, and supplies a controller 20' with an average luminance level signal corresponding to the detected average luminance level. It should be noted that the average luminance level detector circuit 23 may detect an average luminance level of a plural-field portion of R-pixel data, G-pixel data and B-pixel data.

The luminance adjusting manipulation unit 22 generates a luminance adjusting signal corresponding to a luminance level set by the user's luminance adjusting manipulation and supplies this to the controller 20'. For example, if the highest luminance level is set by the user's manipulation, a luminance adjusting signal having a data value "1.0" is supplied to the controller 20'. If the user sets the luminance level which is 90% as high as the highest luminance level, a luminance adjusting signal having a data value "0.9" is supplied to the controller 20'.

Figure 11:
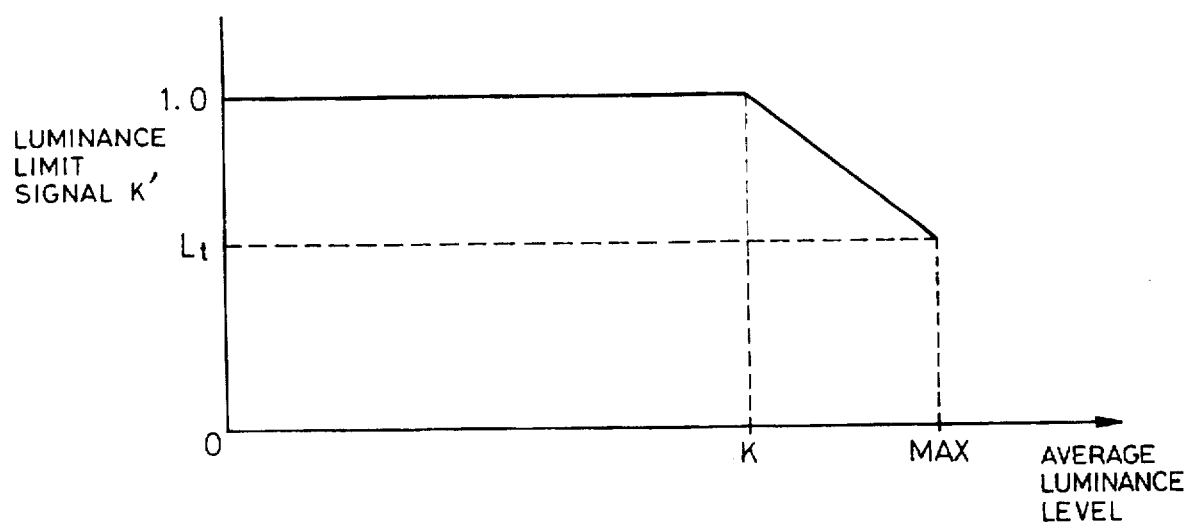
FIG. 11 is a graph for explaining an operation of converting an average luminance level signal to a luminance adjusting signal.

The controller 20 first generates a luminance limit signal K' for limiting the luminance if the average luminance level is larger than a predetermined value K as shown in FIG. 11, in response to the average luminance level signal supplied from the average luminance level detector circuit 23 mentioned above. Next, the controller 20' multiplies the luminance limit signal K' by the luminance adjusting signal supplied from the luminance adjusting manipulation unit 22, and executes the luminance adjusting control subroutine flow shown in FIG. 7 with the multiplication value used as a final luminance adjusting signal.

The controller 20' supplies the read timing signal generator circuit 6 with the luminance mode setting signal generated by executing the luminance adjusting control subroutine. The controller 20' further supplies the gain adjusting circuit 21 with the gain adjusting signal generated by executing the luminance adjusting control subroutine.

As described above, in the embodiment illustrated in FIG. 10, only when the average luminance level calculated based on one field portion (plural-field portion) of pixel data is larger than the predetermined level K as shown in FIG. 11, the luminance adjustment is automatically performed to lower the luminance level by the excessive portion. Thus, according to the ABL operation, when the luminance of the panel produced by emission exceeds the predetermined level, the luminance is continuously adjusted in the decreasing direction so as to suppress the excessive luminance, thus enabling the emission with lower power consumption by limiting the emission for providing the luminance without producing unnatural changes in luminance.

It will be understood from the foregoing description that the luminance adjusting apparatus in a plasma display panel according to the present invention is adapted to perform an adjustment to the number of times of emission and a gain adjustment for pixel data in accordance with the luminance adjustment in association with each other.

Thus, according to the present invention, it is possible to perform the luminance adjustment which provides a continuously changing luminance level without damaging the linearity of images even in a plasma display device which only has two states, i.e., emission and non-emission.

What is claimed is:

1. A luminance adjusting apparatus for a plasma display panel, which divides image information in one field into a plurality of pixel data corresponding to the magnitude of luminance, sets the number of times of emission in each of said pixel data in accordance with the magnitude of luminance, and perform emission driving to provide a gradation display, comprising:

luminance adjusting signal generating means for generating a luminance adjusting signal corresponding to a luminance level to be adjusted;

region determining means for determining which of a plurality of regions defined by ranges different from each other a value of said luminance adjusting signal falls under; and emission frequency setting means for setting a number of times of emission corresponding to a region determined by said region determining means; and gain adjusting means for performing a gain adjustment to said pixel data by a gain characteristic corresponding to said determined region.

2. A luminance adjusting apparatus in a plasma display panel according to claim 1, wherein said luminance adjusting signal generating means generates a signal corresponding to an average luminance level produced based on at least one field portion of said pixel data as said luminance adjusting signal.

3. A luminance adjusting apparatus in a plasma display panel according to claim 1, wherein said gain adjusting means includes means for performing an inverse γ correction in accordance with an inverse γ correcting function, said gain adjusting means adjusting a gain of the inverse γ correcting function in accordance with said gain characteristic to perform the gain adjustment and the inverse γ correction for the pixel data.

* * * * *